United States Patent [19]
Hasegawa et al.

[11] Patent Number: 5,740,359
[45] Date of Patent: Apr. 14, 1998

[54] PROGRAM EXECUTION SYSTEM HAVING A PLURALITY OF PROGRAM VERSIONS

[75] Inventors: Tetsuo Hasegawa; Yasukuni Okataku, both of Tokyo, Japan

[73] Assignee: Kabushiki Kaisha Toshiba, Kanagawa-ken, Japan

[21] Appl. No.: 580,032

[22] Filed: Dec. 20, 1995

[30] Foreign Application Priority Data

Dec. 27, 1994 [JP] Japan .................................. 6-324889

[51] Int. Cl.$^6$ .................. G06F 13/00; G06F 15/16
[52] U.S. Cl. .................. 395/184.01; 395/185.02; 395/184.01; 395/676; 364/285.3; 364/285; 364/280; 364/976
[58] Field of Search .................. 395/185.02, 650, 395/200, 712, 700; 364/285, 285.3, 280, 976

[56] References Cited

U.S. PATENT DOCUMENTS

| | | | |
|---|---|---|---|
| 4,558,413 | 12/1985 | Schmidt et al. | 395/600 |
| 4,817,091 | 3/1989 | Katzman et al. | 364/285 |
| 5,068,783 | 11/1991 | Tanagawa et al. | 364/285 |
| 5,084,878 | 1/1992 | Kanekawa et al. | 371/36 |
| 5,117,352 | 5/1992 | Falek | 395/182.02 |
| 5,155,847 | 10/1992 | Kirouac et al. | 395/600 |
| 5,243,607 | 9/1993 | Masson et al. | 395/185.02 |
| 5,278,979 | 1/1994 | Foster et al. | 395/600 |
| 5,317,722 | 5/1994 | Evans | 395/700 |
| 5,537,539 | 7/1996 | Narihiro | 395/183.14 |
| 5,551,047 | 8/1996 | Mori et al. | 395/182.09 |

OTHER PUBLICATIONS

Abstract Only —Miro–Julia, "LAN Distributed Fault–Tolerance", IFIP Trans. A, Comput. Sci. Technol., A–39:161–174 (1993).
Abstract Only –J.B. Dugan, "Reliability Analysis of a Hardware and Software Fault Tolerant Parallel Processor", IEEE Comput. Soc. Press. (cat. No. 94CH35714) x+222 pp. 74–83 (1994).
Gowa et al., "Common Fault Tolerant Techniques," Professional Safety, v40, n4, pp. 24–27, Apr. 1995.
Purtilo et al., "An Environment for Developing Fault-tolerant Software," v17 n2, pp. 153–159, Feb. 1991.

Primary Examiner—Robert W. Beausoliel, Jr.
Assistant Examiner—Luan C. Do
Attorney, Agent, or Firm—Finnegan, Henderson, Farabow, Garrett & Dunner, L.L.P.

[57] ABSTRACT

A program execution system for a program having one or more versions includes a program storing unit for storing a plurality of program versions, an exclusive condition storing unit for storing invocation data for abnormal termination of a process, an executing unit for selecting a version form among one or more versions of the program corresponding to the process to be invoked, a detecting unit for detecting an abnormality of the process during the execution, and an updating unit for transferring the invocation data. If the currently executing code version fails, the program execution system selects another version for execution, thus minimizing system interruption and improving system reliability.

5 Claims, 12 Drawing Sheets

FIG.3

| COLUMN NUMBER | PROCESS NAME | INVOCATION DATA FOR ABNORMAL TERMINATION(EXCLUSIVE CONDITION) | PROGRAM STARTING ADDRESS |
|---|---|---|---|
| 0 | A | | 0000 |
| 1 | A | | 0800 |
| 2 | A | | 1C00 |
| 3 | B | | 1800 |
| 4 | B | | 2000 |
| 5 | B | | 2200 |

31   32   33   34

| | INVOCATION DATA | COLUMN NUMBER ON THE EXCLUSIVE CONDITION TABLE | ANOTHER STATE OF THE PROCESS |
|---|---|---|---|
| | 43 | 44 | 45 |
| EXECUTING PROCESS | ( 0 , -1 ) | 0 | ... |
| WAITING PROCESS | | | |
| | | | |
| | | | |

FIG.8

| | INVOCATION DATA | COLUMN NUMBER ON THE EXCLUSIVE CONDITION TABLE | OTHER STATE OF THE PROCESS |
|---|---|---|---|
| | 41 | 42 | 43 |
| EXECUTING PROCESS | ( 0 , -1 ) | 0 | ...... |
| WAITING PROCESS | | | |
| | | | |
| | | | |

FIG.9

| COLUMN NUMBER 31 | PROCESS NAME 32 | INVOCATION DATA FOR ABNORMAL TERMINATION(EXCLUSIVE CONDITION) 33 | PROGRAM STARTING ADDRESS 34 |
|---|---|---|---|
| 0 | A | ( 0 , -1 ) | 0000 |
| 1 | A | | 0800 |
| 2 | A | | 1C00 |
| 3 | B | | 1800 |
| 4 | B | | 2000 |
| 5 | B | | 2200 |

FIG.10

| | INVOCATION DATA | COLUMN NUMBER ON THE EXCLUSIVE CONDITION TABLE | OTHER STATE OF THE PROCESS |
|---|---|---|---|
| EXECUTING PROCESS | ( 0 , -1 ) | 1 | ..... |
| WAITING PROCESS | | | |
| | | | |
| | | | |

41 — INVOCATION DATA
42 — COLUMN NUMBER ON THE EXCLUSIVE CONDITION TABLE
43 — OTHER STATE OF THE PROCESS

FIG.11

PROGRAM EXECUTION SYSTEM HAVING A PLURALITY OF PROGRAM VERSIONS

BACKGROUND OF THE INVENTION

1. Field of the Invention

The present invention relates to a program execution system, and more particularly, to a program execution system having a plurality of program versions.

2. Description of the Related Art

In the information processing field, it is very important for a programmer to guarantee the reliability of the program. A program needs to be complete and not fail due to errors encountered during execution. However, as computer hardware technology advances, programs are becoming larger and more complex, making it difficult to achieve reliability.

It is known that when a version of a program fails, the system uses another version of the program having the same function as the failed program to minimize job discontinuity. Such a system has a plurality of program versions with each version containing the same function but a slightly different code.

If the currently executing code version fails, the program execution system selects another version for execution. This can be done in two ways. The first way is to maintain a static priority order among all versions of the code. The second way is, when a process or routine calls and activates another procedure, the system statically selects the program version of the called process corresponding to the calling process.

However, the known systems have the following problems. The known systems use a fixed condition, e.g., giving a fixed priority to each version, in order to select a version of a program. If it is ascertained that a program version failed due to certain invocation or call-up data, the system will execute another version of the same program. Nevertheless, if the system executes the other version of the same program according to the same specified initial data next time, the system will repeatedly fail. To avoid such a situation, the programmer must interrupt the system execution and modify the condition in order to select another version of the program.

SUMMARY OF THE INVENTION

Accordingly, the present invention is directed to a program execution system that substantially obviates one or more of the problems due to limitation and disadvantages of the related art.

Additional features and advantages of the invention will be set forth in the description which follows, and in part will be apparent from the description, or may be learned by practice of the invention. The objectives and other advantages of the invention will be realized and attained by the apparatus particularly pointed out in the written description and claims hereof as well as the appended drawings.

To achieve these and other advantages and in accordance with the purpose of the invention, as embodied and broadly described, the invention provides a program execution system including program storing means for storing a plurality of program versions, each version corresponding to a process; exclusive condition storing means for storing invocation data for abnormal termination of a process, as an exclusive condition in order to exclude the version of the program corresponding to the abnormal termination; executing means for selecting a version from among one or more versions of the program corresponding to the process to be invoked, based on the exclusive condition stored in said exclusive condition storing means, for invoking the process based on the selected version of the program, and for executing the process; detecting means for detecting an abnormality of the process during the execution; and updating means for transferring the invocation data, detected by said detecting means upon abnormal termination of the executing process, into said exclusive condition storing means as one of the exclusive conditions.

In another aspect, the invention is a program execution method for a program having one or more versions, comprising the steps of waiting for an invocation request in a state of waiting; invoking a program version process not containing an exclusive invocation condition; determining whether the invoked process completes without abnormal termination; sending invocation data to another processing unit if the invoked process abnormally terminates; and updating invocation data for an abnormally terminated process.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate embodiments of the invention and, together with the description, serve to explain the objects, advantages, and principles of the invention.

IN THE DRAWINGS

Figure 1A:
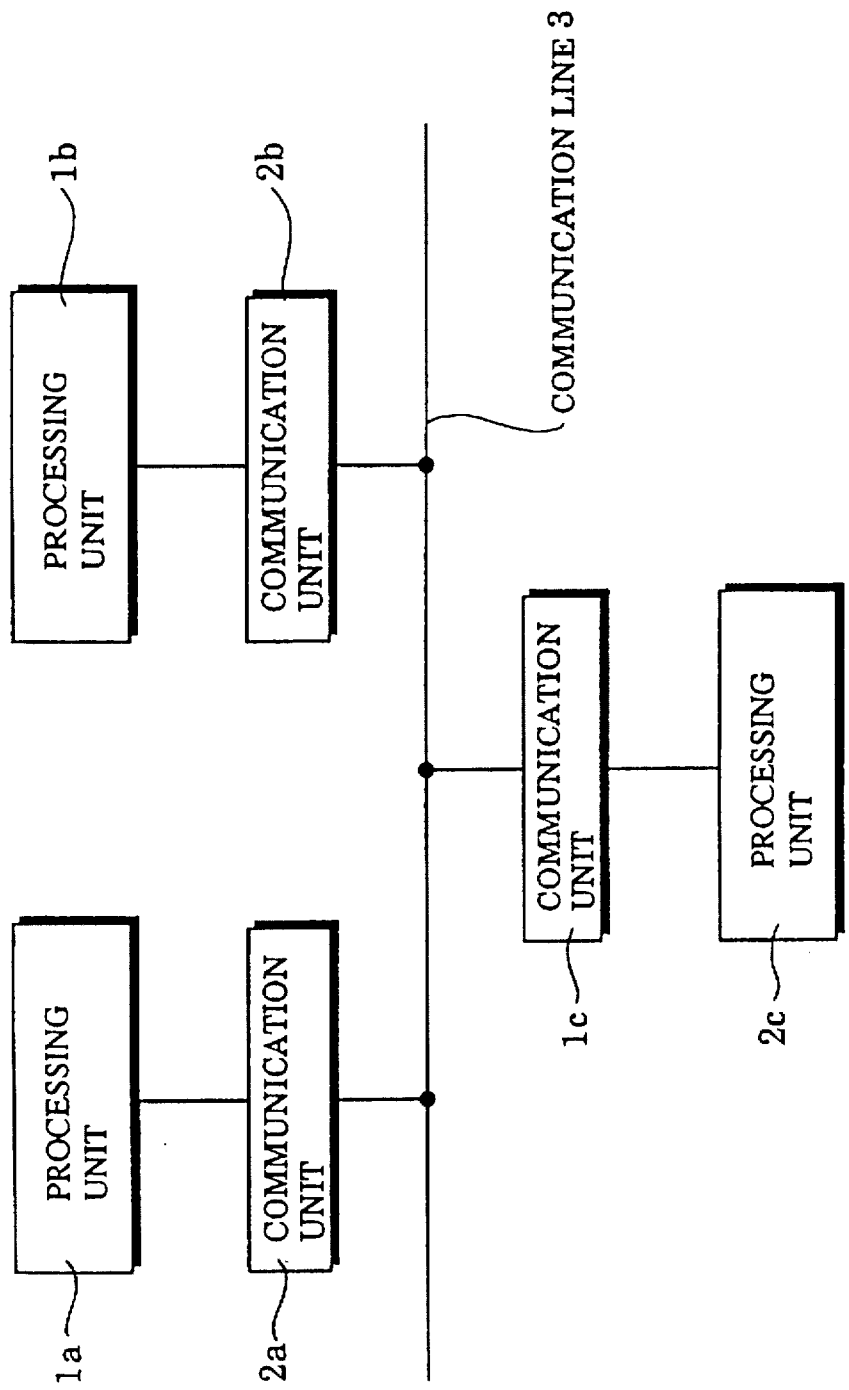
Figure 1B:
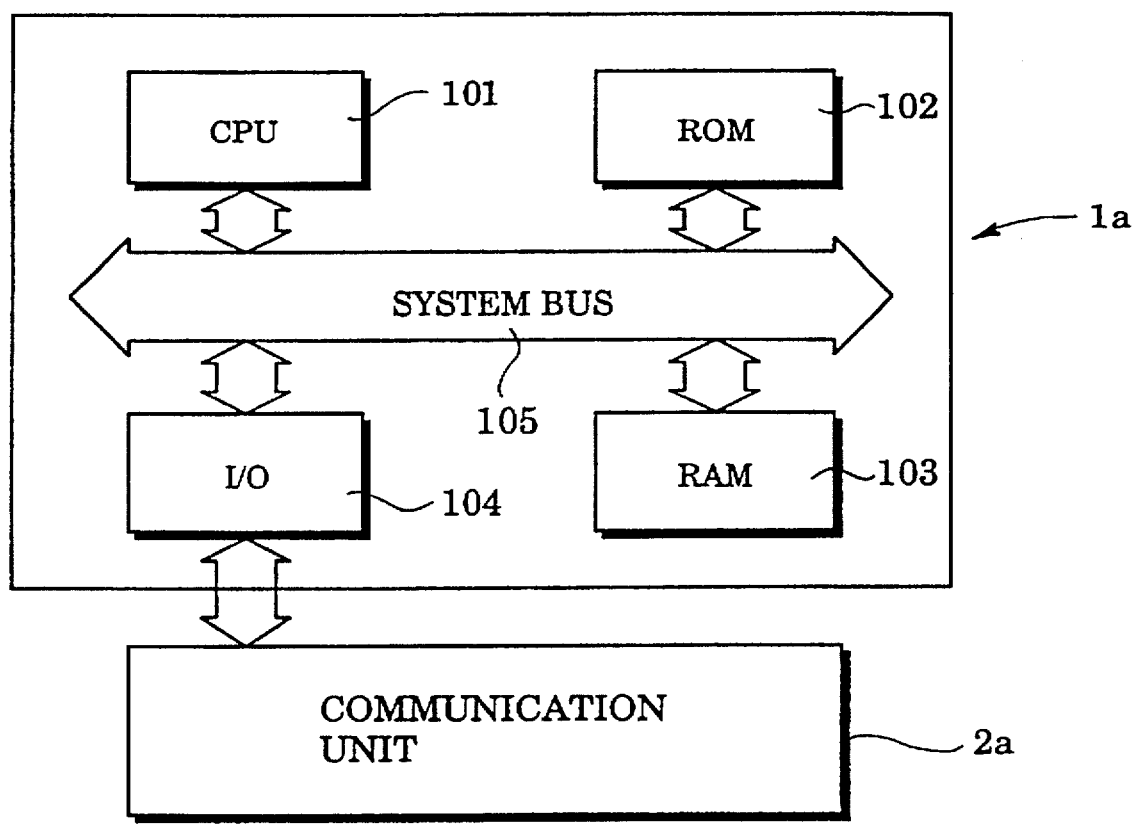
Figure 2:
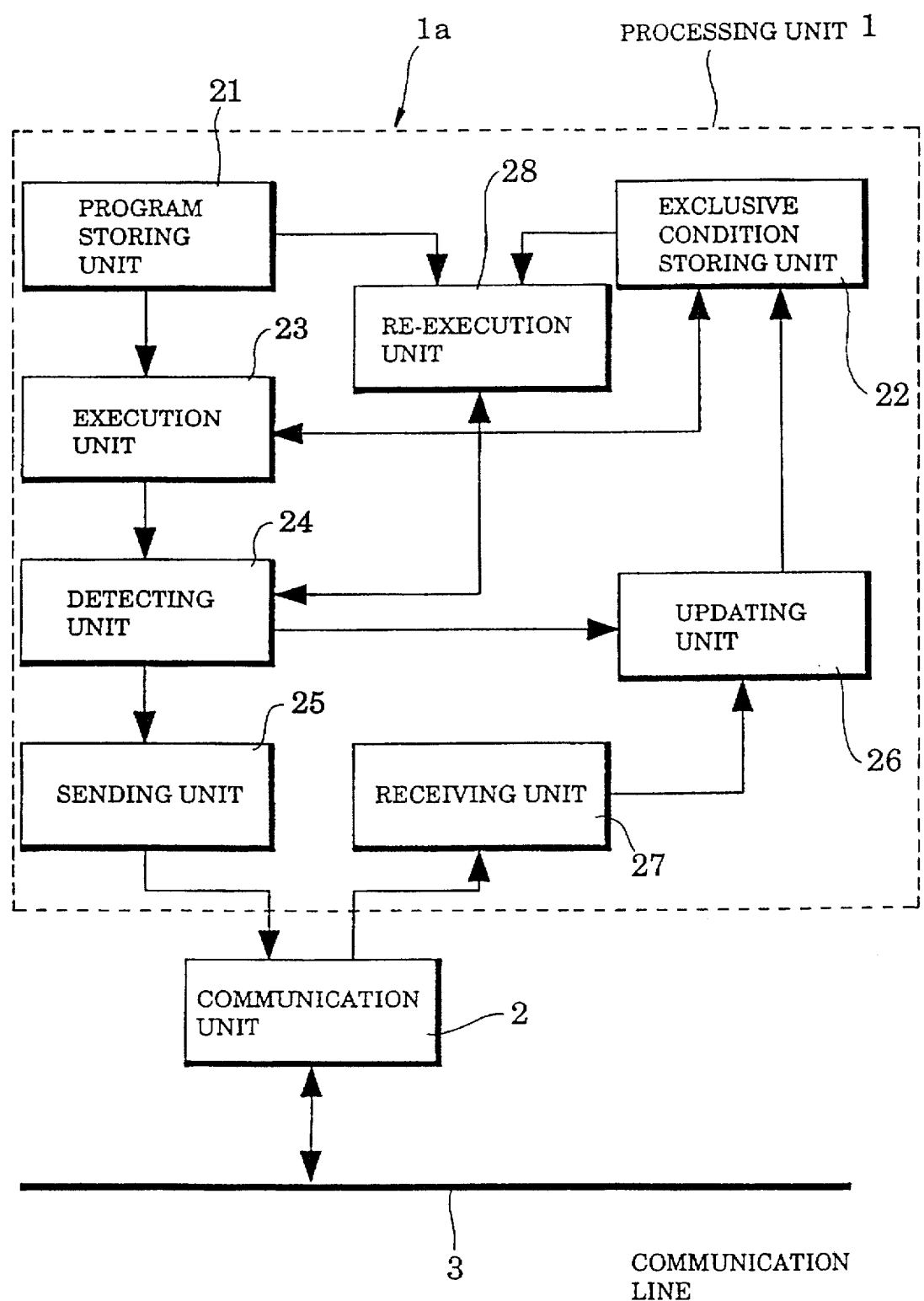
Figure 4:
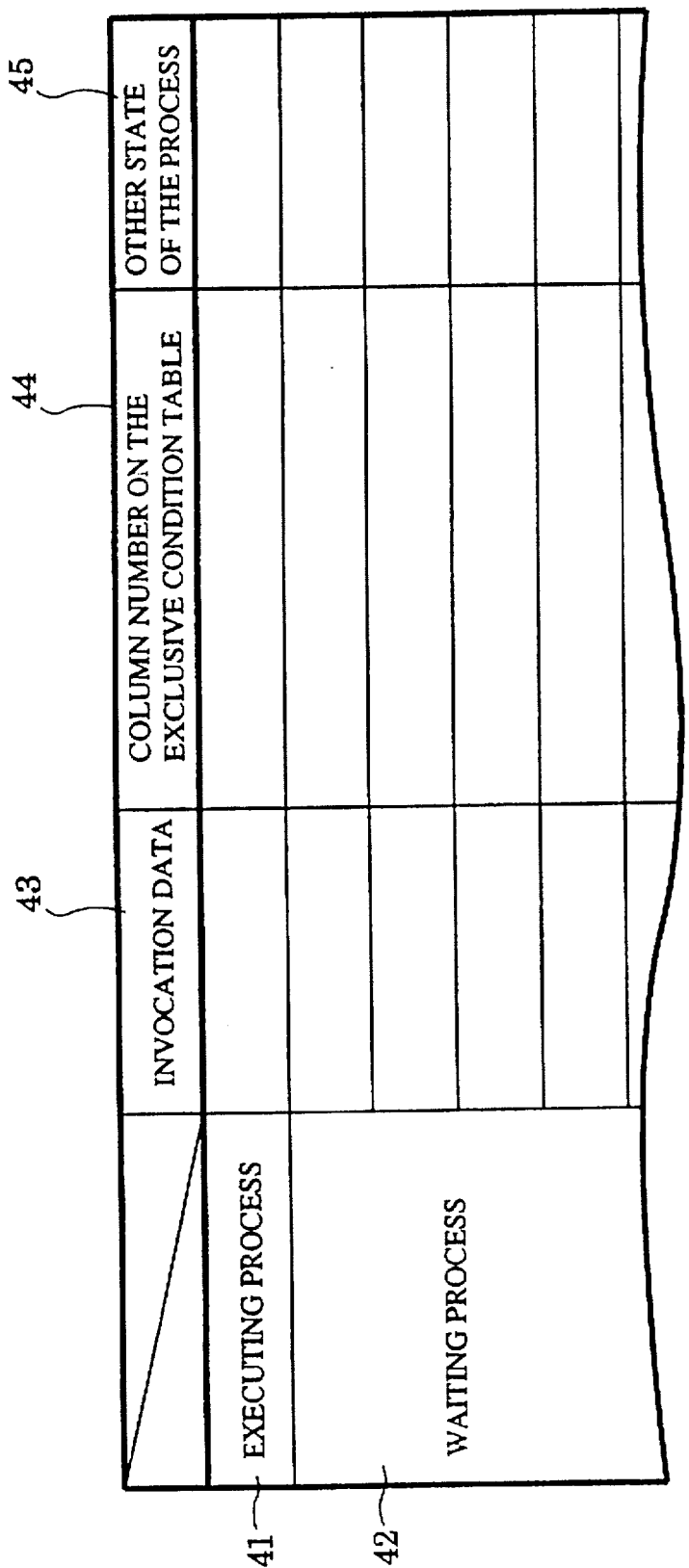
Figure 5:
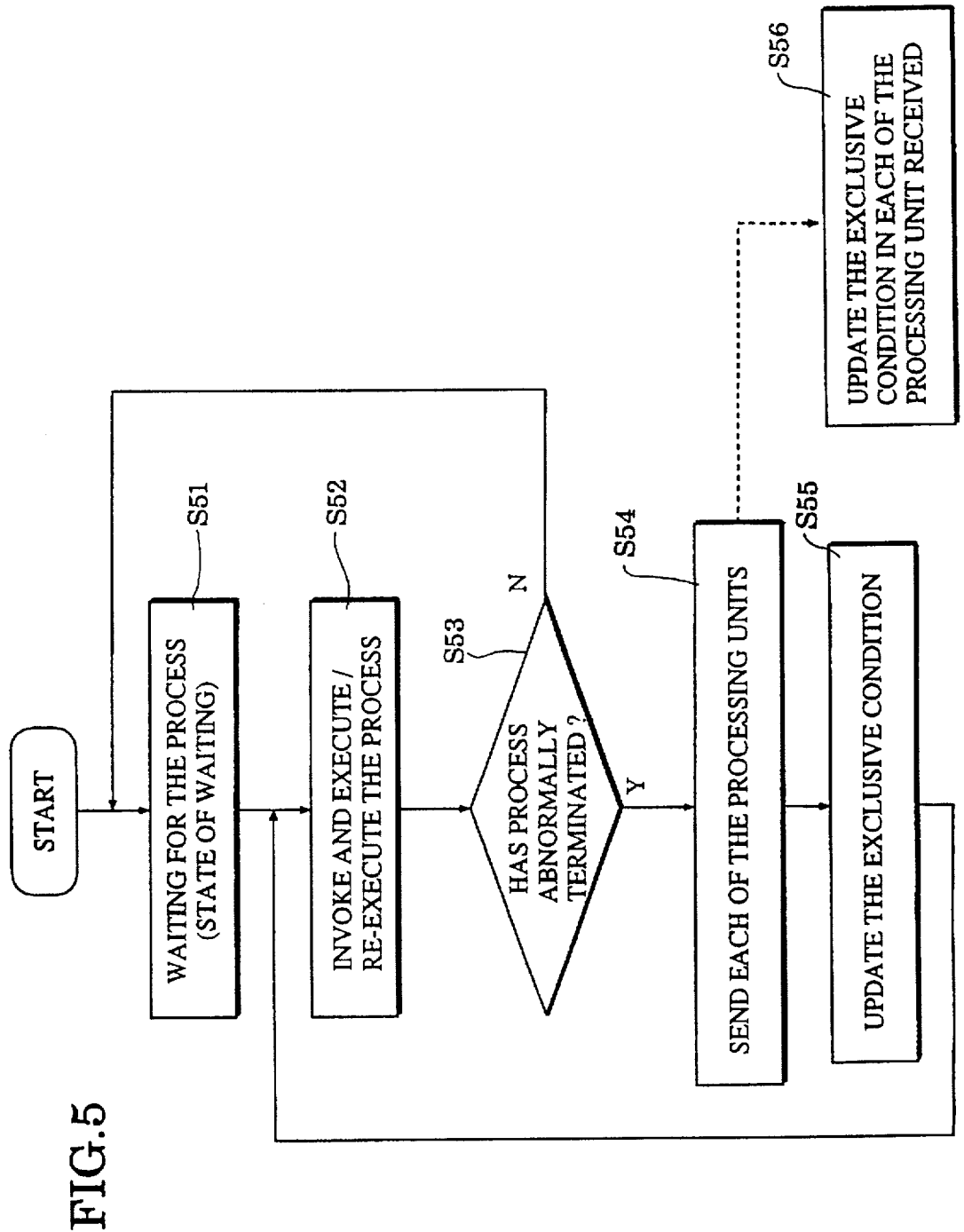
Figure 6:
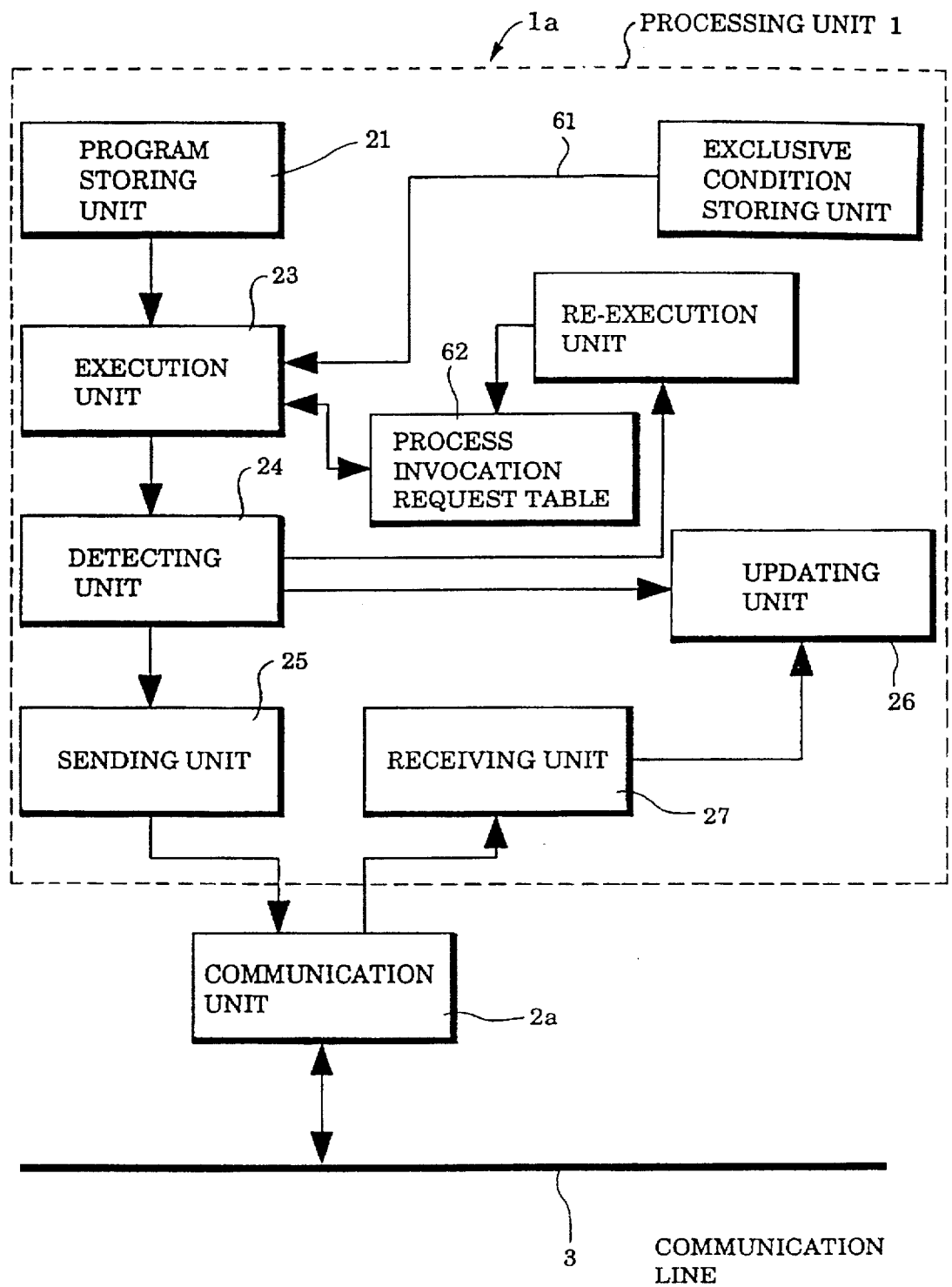
Figure 7:
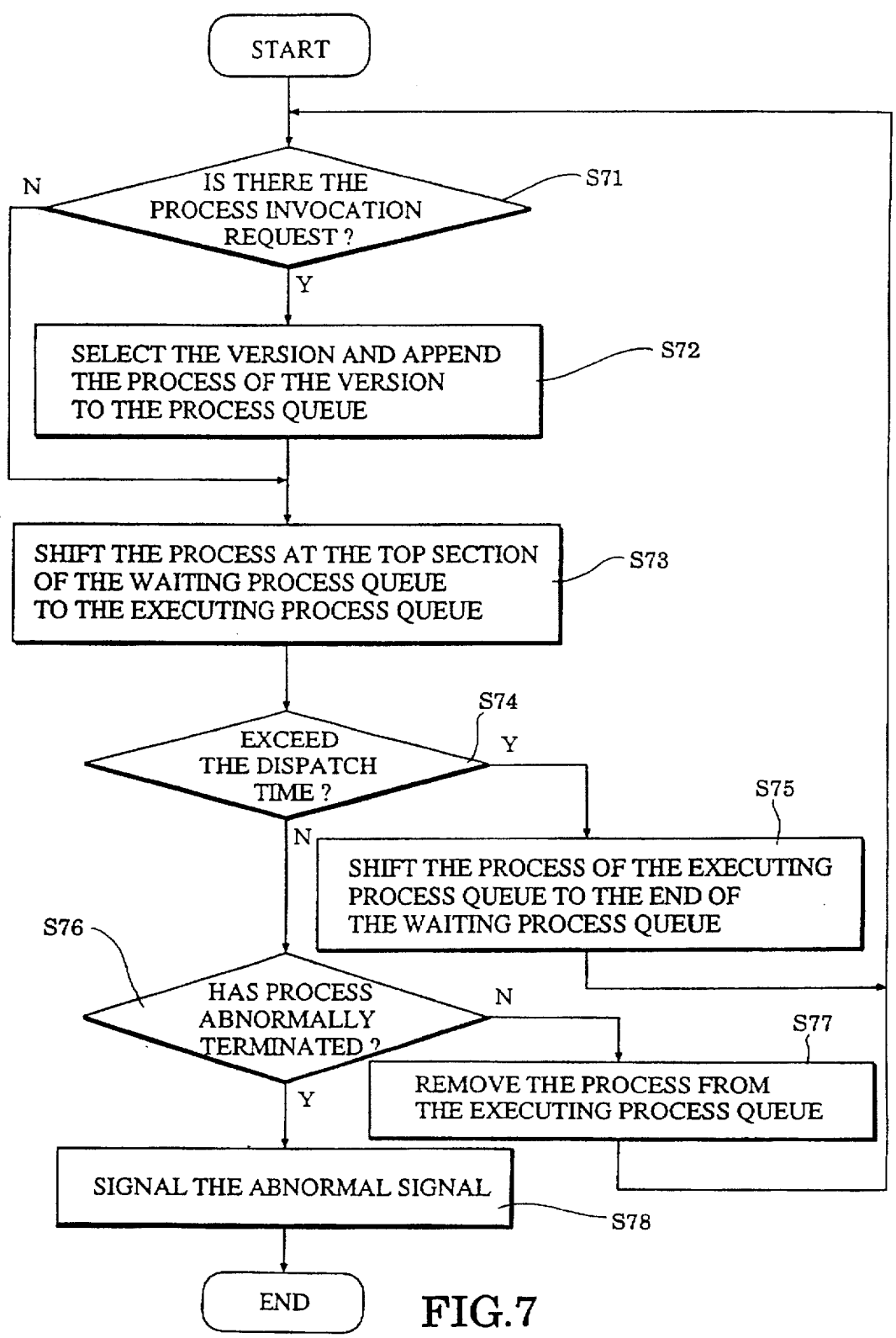

FIG. 1A is a block diagram depicting a program execution system;

FIG. 1B is a block diagram of a processing unit of FIG. 1A;

FIG. 2 is a block diagram showing a program executing system according to a first embodiment of the present invention;

FIG. 3 is a diagram of an exclusive condition table;

FIG. 4 is a diagram of a process queue;

FIG. 5 is a flow diagram illustrating the operation of the processing unit of FIG. 2 according to the present invention;

FIG. 6 is a block diagram of a processing unit according to a second embodiment of the present invention;

FIG. 7 is a flow diagram illustrating the operation of the processing unit of FIG. 6 according to the present invention;

FIG. 8 is a diagram of a process queue showing invocation data during the waiting process;

FIG. 9 is a diagram of a process queue showing invocation data during the waiting process;

FIG. 10 is a diagram of an exclusive condition table during execution;

FIG. 11 is a diagram of a process queue showing invocation data during the waiting process

DETAILED DESCRIPTION OF THE PREFERRED EMBODIMENTS

Embodiments of the present invention will be described below with reference to the accompanying drawings, in which the same reference numerals denote the same parts throughout the accompanying drawings.

An embodiment of the present invention provides a program execution system having a plurality of program versions. The program execution system prepares multiple versions of a program, with each version containing the same function but a slightly different code.

If the currently executing code version fails, the program execution system selects another version for execution. This is can be done in two ways. The first way is to maintain a static priority order among all versions of the code. The second way is, when a process or routine calls and activates another procedure, the system statically selects the program version of the called process corresponding to the calling process.

FIG. 1A shows one configuration of a program execution system. The illustrated system of FIG. 1A comprises several processing units one of which is shown in FIG. 1B. In this embodiment, one of the processing units 1a executes a process or procedure for a program. In FIG. 1A, each processing unit, 1a, 1b, 1c calls up or invokes a process corresponding to a program and executes it. Each processing unit, 1a, 1b, 1c is connected to each other by a communication line 3, e.g., a local area network and a bus connection, through communication units, 2a, 2b, 2c, respectively. Each communication unit 2a, 2b, 2c, controls the communication between processing units.

FIG. 1B schematically shows the structure of processing unit 1a. Processing unit 1a comprises a CPU (Central Processing Unit) 101, a ROM (Read Only Memory) 102, a RAM (Random Access Memory) 103, an I/O unit (Input/Output unit), and a system bus for enabling communication between the processing unit components.

FIG. 2 shows the program execution system having a mechanism for updating an excluding or exclusive condition according to the first embodiment of the present invention. Each processing unit, 1a, 1b, 1c, connected by communication unit, 2a, 2b, 2c, respectively, executes a process for programs having a plurality of different program versions depending on the application or circumstance. This means that there are one or more versions of the same program for each process. Thus, all versions of the same program have the same process name and performs the same function(s).

A program storing unit 21 stores each version of a program, having one or more versions corresponding to a process.

An exclusive condition storing unit 22 stores information related to an invocation condition for each process, to exclude a version of program which has terminated abnormally during execution.

FIG. 3 shows the data structure of an exclusive condition table stored in the exclusive condition storing unit 22. In FIG. 3, the exclusive condition table consists of four fields, which corresponds to a program version, namely, column number 31, process name 32, invocation data for abnormal 33, i.e., an exclusive condition, and program starting address 34 corresponding to a program version of a program. One of the four fields corresponds to one version of a program. The exclusive condition 33 works as follows. If the information relating to invocation matches the exclusive condition 33 of the exclusive condition table, an execution unit 28, described below, invokes another program version corresponding to the same process, but does not invoke the program version corresponding to the matching exclusive condition. As stated above, each program having one or more versions is stored in program unit 21 and the program starting address 34 points to the top address of memory storing the program version.

As shown in FIG. 2, an execution unit 23 invokes and executes a process. A detecting unit 24 detects abnormal termination when an executing process terminates. When abnormal termination is detected by detecting unit 24, sending unit 25 sends various data to another processing unit, 1a, 1b, 1c through a communication unit, 2a, 2b, 2c. The data is received by the receiving unit 27 and an updating unit 26 updates the exclusive condition table stored in the exclusive condition storing unit 22. A re-execution unit 28 executes a process based on another version of the program instead of the abnormally terminated version.

The state of the executing process and the waiting process are entered into each process queue. FIG. 4 shows the data structure of each process queue. In FIG. 4, the executing process queue 41 stores the state of one executing process and the waiting process queue 42 stores a plurality of waiting process states. In this instance, there are no executing process states and no waiting process states in the process queues. Each process queue consists of invocation data 43, the column number on the exclusive condition table 44, i.e., the column number in FIG. 3, and other general states of the process 45.

The program executing system constructed, as discussed above, is operated as follows.

FIG. 5 is a flow diagram illustrating the operation of the program execution system according to the first embodiment of the present invention(FIG. 2). An invocation request for a process occurs. The invocation request is triggered by a working process, or is sent by another processing unit, 1a, 1b, 1c through the communication line 3. If there is no invocation request, each of the processing unit, 1a, 1b, and 1c is waiting for the invocation request, in a state of waiting (STEP 51).

When the invocation request occurs and is entered into the process invocation request table 62, the execution unit 23 (FIG. 3) invokes a program version process not containing the exclusive invocation condition (STEP 52). The execution unit 23 invokes and executes the program version process which has yet not yet been abnormally by the terminated invocation data.

For example, the processing unit 1a, shown in FIG. 1 receives an invocation request with the process name A and invocation data (0,–1) sent by another processing unit, 1b or 1c. As shown in FIG. 3, there is no exclusive conditions in this case. Consequently, the execution unit 23 selects 0000 as the starting address of a program with column number 0, which is the smallest column number among the column numbers with a process A, and appends A to the waiting process queue (FIG. 4).

Thereafter, the execution unit 23 moves the appended data into the executing process queue and executes the process. When the process has spent a predetermined time, referred to as a dispatch time, or the process completes without abnormal termination (STEP 53), the execution unit 23 proceeds to STEP 51 to repeat the above operation. If the process terminates abnormally(STEP 53), the detecting unit 24 detects the abnormal termination. The abnormal termination means, for example, that a process operates for an invalid address.

If the detecting unit 24 detects abnormal termination, it determines the appropriate invocation data based on the process name and the column number of the exclusive condition table (FIG. 3), and informs the sending unit 25, the updating unit 26 and re-execution unit 28 (STEP 54). In other words, the detecting unit 24 decides (0,–1) as the invocation data due to abnormal termination and 0 as the column number shown in FIG. 3. The sending unit 25 sends information to another processing unit, 1b or 1c through the communication line 3.

The updating unit 26 updates the invocation data for the abnormally terminated processes, as exclusive condition in the exclusive condition storing unit 22 (STEP 55, STEP 56).

Then re-execution unit 28 selects 0800 as the program starting address, which is column number 1 which is the smallest column number, from a plurality of program versions with process name A (See FIG. 11).

According to the above discussion, the program execution system stores one or more versions of the program, and appends and stores the invocation data, i.e., the exclusive condition, when one process abnormally terminates using one version of program. When the program execution system activates a process, it excludes a version containing the invocation data, which is the exclusive condition, and process execution. Therefore, the program execution system can avoid abnormal termination of a process and thus, improve system reliability.

In the first embodiment of present invention, although the processing units are distributed, respectively, the program execution system updates the exclusive condition when any processing unit terminates abnormally, and consequently causes all processing units to reflect the updated exclusive condition. Thus, this also improves system reliability.

Also, as the program execution system immediately re-executes another version of the program, it avoids, interruption during operation.

FIG. 6 shows the program execution system with a mechanism to update exclusive condition according to a second embodiment of the present invention. This embodiment differs from the previously discussed first embodiment as follows. A re-execution management unit 61 updates a process invocation request table 62 only according to a re-execution instruction by the detecting unit 24. Execution unit 23 executes a process according to the process invocation request table 62 regardless of re-execution management unit 61.

The operation of each of the units is explained according to FIG. 7.

For example, the processing unit 1a, shown in FIG. 1A receives an invocation request with process name A and invocation data (0,-1) sent by another processing unit, 1b or 1c. The invocation request is written into the process invocation request table 62. As shown in FIG. 3, there is no exclusive conditions in this case and the process queue is empty (FIG. 4).

The execution unit 28 refers to the process invocation request table 62 (FIG. 6) and reads the written process name and the invocation data, and thus obtains a process invocation request(STEP 71). Also, the execution unit 23 searches the exclusive condition table (FIG. 3) and selects a version of the program not containing the invocation data (0,-1) as an exclusive condition of choosing from a plurality of program versions with the process name A. In this embodiment, as shown in FIG. 3, there is no exclusive condition among any version of the program corresponding to the process name A. Consequently, because none of the program versions have the invocation data (0,-1) as the exclusive condition, the execution unit 23 selects a program corresponding to the smallest column number with the process name A. The execution unit 23 appends the column number 0 and the program starting address 0000 to the end of the waiting process queue(STEP 72).

The execution unit 23 then shifts the contents currently at the top of the waiting process queue to the executing process queue and executes the process(STEP 73). When the process has spent the dispatch time given for A(STEP 74), the execution unit 23 shifts the process of the executing process queue to the end of the waiting process queue (STEP 75), and the execution unit 23 proceeds to STEP 71 to repeat the above operation. If the execution unit 23 could terminate normally (STEP 76), it removes A from the process queue (STEP 77). Conversely, if the executing process A terminates abnormally (STEP 76), the execution unit 23 signals an abnormal signal(STEP 78).

As shown in FIGS. 2 and 6, if the detecting unit 24 detects the abnormal signal, it determines (0,-1) as the invocation data for abnormal termination and 0 as the column number in the exclusive condition table based on the contents of the executing process queue. The detecting unit 24 informs sending unit 25, updating unit 26, and re-execution management unit 61.

The sending unit 25 sends (0,-1) and 0 to another processing unit, 1b or 1c, through the communication line 3. The updating unit 26 appends (0,-1) as the exclusive condition to a section corresponding to column number 0 in the exclusive condition table (FIG. 3).

One the other hand, when other processing units, 1b or 1c, receive the invocation data and the column number by sending unit 25 of a processing unit 1a, the processing unit receiving the information informs its updating unit 26. The updating unit 26 similarly appends (0,-1) as the exclusive condition to its invocation data section with the column number 0 in the exclusive condition table. Consequently, each exclusive storing unit 22 is updated with exclusive condition (0,-1)and column number 0.

The re-execution management unit 61, which receives invocation data (0,-1) and column number 0 from detecting unit 24 determines that process A is the process invocation request corresponding to column number 0, and writes A and (0,-1) into the process invocation request table 62.

The execution unit 23 again refers to the process invocation request table 62 and receives A and (0,-1) which is the new invocation process request (STEP 71). The execution unit 23 searches the exclusive condition table and selects a version of the program not containing the invocation data (0,-1) as the exclusive condition of choosing from a plurality of program versions with process name A. In this case, as shown in FIG. 10, the execution unit 23 selects column number 1, which does not contain invocation data (0,-1). As shown in FIG. 11, the execution unit 23 appends column number 1 and invocation data (0,-1) to the end of the waiting process queue (STEP 72).

As shown in FIGS. 8 and 9, the execution unit 23 then shifts the contents currently at the top of the waiting process queue to the executing process queue and executes the process (STEP 73).

After that above operation, when the invocation request is A and exclusive condition is A and exclusive condition is (0,-1) in the processing unit 1a, 1b or 1c, the execution unit 23 excludes the program version of a process with column number 0 and executes the program version of a process with column number 1.

Additional advantages and modifications will be apparent to those skilled in the art. The invention in its broader aspects is therefore not limited to the specific details, representative apparatus and method, and illustrative examples are and described. Accordingly, departure may be made from such details without departing from the spirit or scope of the general inventive concept. Thus, it is intended that this invention cover the modifications and variations of the invention provided they are within the scope of the appended claims and their equivalents.

What is claimed is:

1. A program executing system for a program having one or more versions, comprising:

program storing means for storing a plurality of program versions, each version corresponding to a process;

exclusive condition storing means for storing invocation data of a process terminated abnormally, as an exclusive condition, in order to exclude the version of the program corresponding to the process terminated abnormally;

executing means for selecting one of the plurality of program versions, based on the invocation data stored in said exclusive condition storing means, for invoking the process based on the selected program version, and for executing the process;

detecting means for detecting an abnormality of the executing process; and updating means for transferring the invocation data associated with the abnormally executing process detected by said detecting means into said exclusive condition storing means as one of the exclusive conditions.

2. A program executing system according to claim 1, further comprising re-execution means for re-executing the process corresponding to the program version not containing the exclusive condition updated by said updating means.

3. A processing unit for use in a program executing system with a program having one or more versions and a plurality of the processing units connected by a communication line, said processing unit comprising:

program storing means for storing the one or more versions of the program, each corresponding to a process;

exclusive condition storing means for storing invocation data of a process terminated abnormally, as an exclusive condition, in order to exclude the version of the program corresponding to the process terminated abnormally;

executing means for selecting a version from among the one or more versions of the program, based on the exclusive condition stored in said exclusive condition storing means, for invoking the process based on the selected version of the program, and for executing the process;

detecting means for detecting an abnormality of the executing process;

updating means for transferring the invocation data associated with the abnormally executing process detected by said detecting means into said exclusive condition storing means, as one of the exclusive conditions; and sending means for sending the exclusive condition to be transferred by said updating means to another one of the plurality of processing units.

4. A program executing system according to claim 3, wherein said updating means includes means for transferring invocation data into said exclusive condition storing means according to an exclusive condition sent from another processing unit.

5. A program execution method for a program having one or more versions, executed on a processing unit, comprising the steps of:

waiting for an invocation request;

invoking a process implemented by a program version not containing an exclusive invocation condition;

determining whether the invoked process terminates abnormally;

sending invocation data to another processing unit if the invoked process terminates abnormally; and updating the invocation data when the determining step determines the invoked process terminates abnormally.

* * * * *